United States Patent Office 3,539,964
Patented Nov. 10, 1970

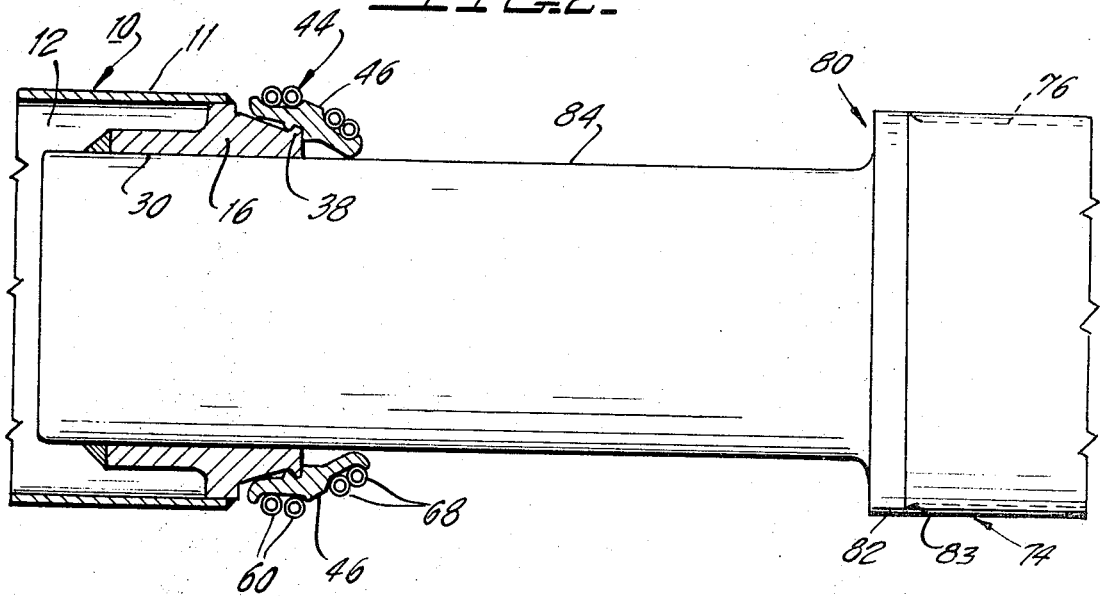
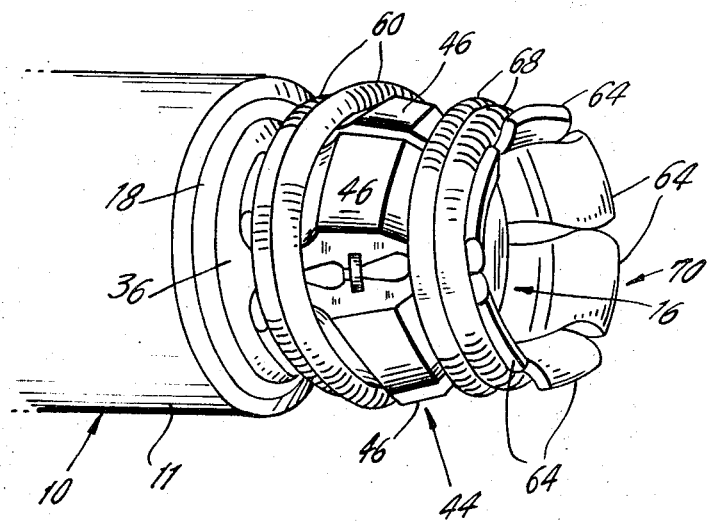

3,539,964
EXPANSION JOINT FOR ENDWISE JOINING OF CONDUCTORS OF AN ISOLATED PHASE BUS BAR
Joseph A. Turgeon, Toronto, Ontario, Canada, assignor to I-T-E Circuit Breaker (Canada) Limited, Port Credit, Ontario, Canada, a limited-liability company of Canada
Filed Dec. 4, 1968, Ser. No. 780,990
Int. Cl. H01r 41/00
U.S. Cl. 339—9                               11 Claims

ABSTRACT OF THE DISCLOSURE

An isolated phase bus bar, comprising two conductors to be mechanically and electrically joined endwise-in a manner that permits relative axial shifting of the conductors, the second conductor having an internal passageway into which the first conductor passes as the conductors shift; the bus bar joint comprising a support element, extending from the end of the second conductor, on which a plurality of spring-biased contact elements are supported for rocking motion to receive and securely engage an end port on the first conductor.

---

This invention relates to isolated phase bus bars for carrying high amperages and more particularly to an expansion joint for joining two conductors of the isolated phase bus bar endwise in a manner that permits axial shifting of these conductors with respect to each other, while maintaining secure electrical and mechanical engagement between them.

Isolated phase bus bars are used to carry very high amperages, of the order of 1000 amperes upward. Frequently, these amperages are carried at high voltages, of the order of 15 kv. upward. Such high power levels exist, for example, at hydroelectric power generating stations. The isolated phase bus bars carry power from the generating installation to the power distribution installation which distributes the power among various transmission lines.

An isolated phase bus bar may be comprised of one conductor, or of a number of conductors, each of which is electrically and mechanically joined endwise to its neighboring conductors. A conductor forming part of an isolated phase bus bar is a hollow tube of electrically conductive material, e.g. a metal such as aluminum. The width of a conductor may exceed one foot and its length may be hundreds of feet. These dimensions will vary in different installations. Normal expansion of the conductors of a bus bar occurs as the ambient temperature varies and as the conductor naturally heats up and cools off when it is respectively transmitting and not transmitting power. Conventional connecting devices, e.g. braided or laminated flexible connectors, for endwise joining of neighboring bus bar conductors permits usual axial shifting of the conductors with respect to each other while maintaining secure electrical and mechanical engagement.

Normally, an isolated phase bus bar extends horizontally between the generating and distribution installations over a run of a few hundred feet. However, in certain power installation and, in particular, in hydroelectric installations, the generating installation is located at the base of a hill, i.e. at the bottom of a waterfall, while the distributing installation is located at the top of the hill, above the waterfall. Here, an isolated phase bus bar runs vertically, rather than horizontally. Usually, shifting from a horizontal to a vertical run for an isolated phase bus bar has no effect on the extent of the relative axial shifting of the conductors forming this bus bar. However, considerable excavation of the terrain surounding a hydroelectric power installation is frequently required for installing the generating and transmitting equipment and, perhaps, for strengthening and altering the hillside around and beneath the waterfall. The generating installation is anchored in solid rock at the base of the hill to prevent its shifting. After the excavation is completed, the side of the hill is formed of soil and rock fill and the top of the hill is a rock slab. The distributing installation is at the top of the hill.

When there has been considerable excavation and replacement of terrain, it is expected that the ground will shift and settle. The generating installation at the base of the hill is anchored and will not shift. The distributing installation at the top of the hill will usually shift and settle with the ground. Each distributing installation at each power station shifts a different amount and at a different rate than other power stations due to variations in the consistency of the terrain, the extent of the excavation, the height of the hill, etc.

To prevent stretching or compression of an isolated phase bus bar extending between a stationary generating installation and a shifting distributing installation, the present invention contemplates that this bus bar should be formed of at least two conductors which are mechanically and electrically joined endwise by an expansion joint which permits axial shifting of these bus bars with respect to each other, while maintaining secure electrical and mechanical engagement therebetween.

In the present invention one of the conductors has a contact means support element secured to its end. This support element includes a guide for movement of a contact means. A rigid contact means, guided by the guide on the support element, is held on the support element and has a first contact surface which engages the support element. The contact means includes a second contact surface, which is biased inward. As end portion of a second conductor is forced past the second contact surface of the contact means into a receiving passageway within the first conductor. The second contact surface maintains tightly biased engagement with the second conductor thereby ensuring secure mechanical and electrical contact between the conductors through the contact means support element the contact means.

Accordingly, it is a primary object of the present invention to provide an expansion joint for endwise joining of the conductors of an isolated phase bus bar.

It is another object of the present invention to provide such a joint which maintains secure electrical and mechanical contact between the conductors of an isolated phase bus bar.

It is another object of the present invention to provide such a joint which also permits greater relative axial shifting of the conductors of the isolated phase bus bar than connectors prior art joints, using braided or laminated flexible connectors.

It is another object of the present invention to provide a durable joint for the conductors of an isolated phase bus bar.

These and other objects of the present invention will become apparent when the following description is read in conjunction with the accompanying drawings, in which:

FIG. 2 is a side elevation in cross-section, of two conductors of an isolated phase bus bar joined endwise by a novel joint in accordance with the invention;

FIG. 3 is a perspective view of the contact means shown in FIG. 1; and

In the figures, a portion of an isolated phase bus bar is shown.

The manner in which the isolated phase bus bar shown in the figures is held within its housing (not shown) is illustrated in copending application Ser. No. 711,247, filed March 7, 1968, now Pat. No. 3,459,876, issued Aug. 5, 1969, Joseph A. Turgeon, entitled "Support Structure Including Criss-Cross Tie Rods for Isolated Phase Busbar System," and assigned to the assignee hereof.

Figure 1:
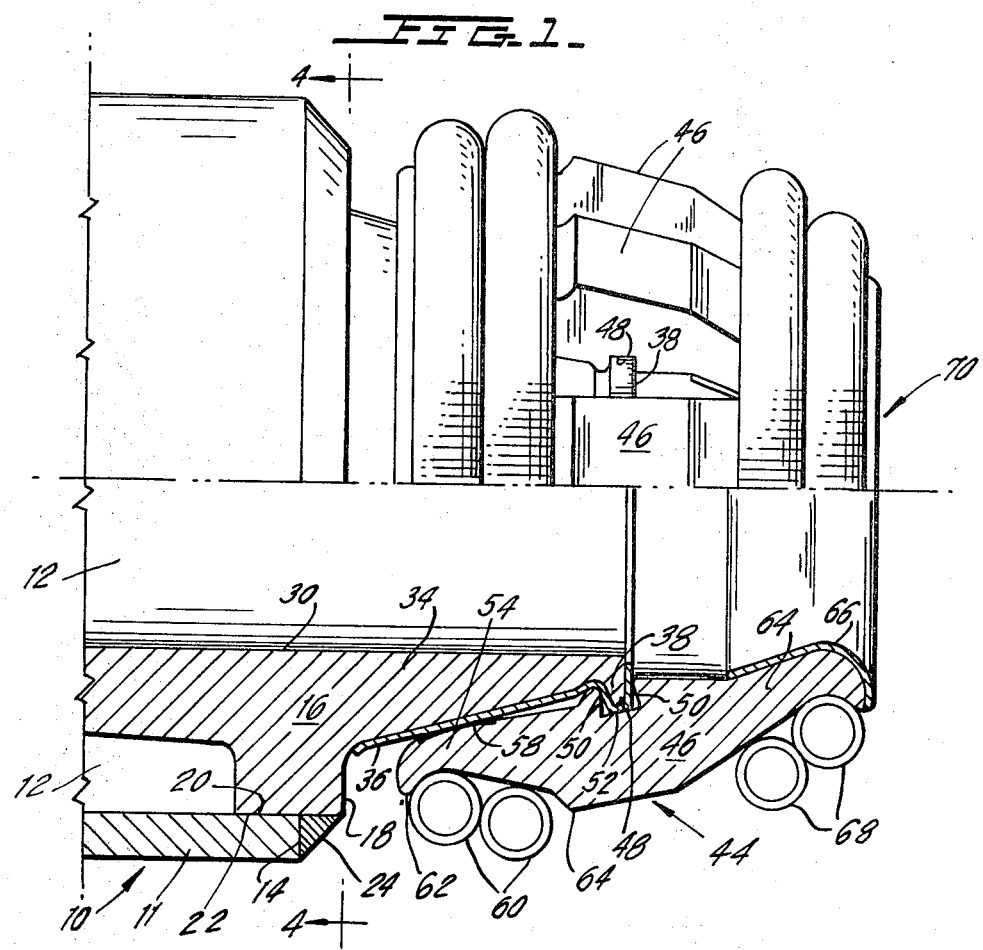
FIG. 1 is a side elevation, with the bottom half in cross-section, of one conductor of an isolated phase bus bar adapted with an expansion joint designed in accordance with the present invention.
Figure 4:
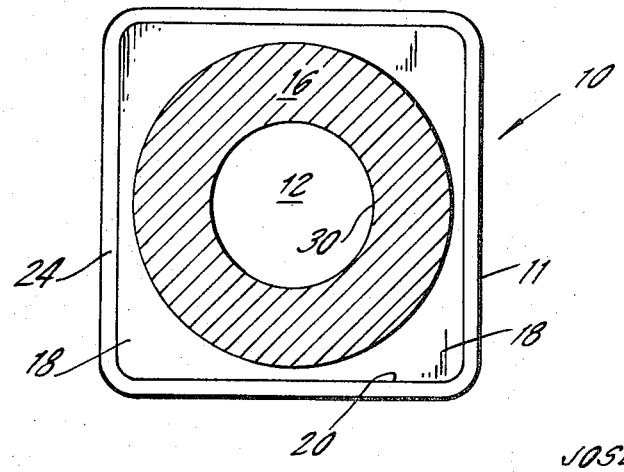
FIG. 4 is an end elevation view of the conductor of FIG. 1 in the direction of arrows 4 and along the line 4—4 of FIG. 1.

In FIGS. 1 and 4, a conductor 10 is illustrated, which is in the form of a metallic, electrically conductive hollow tube 11 formed of aluminum. As shown in FIG. 4, tube 11 has a rectangular cross-section, although the cross-sectional shape of the tube 11 is of no significance in the present invention. Tube 11 is sufficiently thick to safely conduct high amperages. Hollow tube 11 defines a passageway 12 for receiving the narrow width end portion 84 of the conductor 74, to be described below. Conductor 10 has an end 14 which faces toward the conductor 74 and which receives the portion 84 of the conductor 74, as described below.

Positioned adjacent end 14 of conductor 10 is a contact means support element 16. This support element has its own support flange 18 around its periphery. The flange has an outer peripheral surface 20 which is shaped to conform to the interior surface 22 of tube 11 so that surface 20 may be bonded, e.g. by welding, to surface 22 for providing secure electrical engagement. Weld 24 is illustrated for joining flange 18 to surface 22. Support element 16 serves as part of the mechanical means for supporting conductor 74 with respect to conductor 10 and as part of the electrical pathway between these conductors. Support element 16 is effectively part of conductor 10. Thus, element 16 is formed of an electrically conductive material, e.g. a metal such as aluminum, and is rigid to provide mechanical support in the manner described more fully below for the contact means 44. The bond between flange 18 and interior surface 22 of conductor tube 11 should be electrically secure to provide good direct conductivity between these elements.

Referring to FIGS. 1, 2 and 4, support element 16 has an interior surface 30 which is shaped to conform to the end portion 84 of conductor 74. End portion 84 has a cross-section only slightly smaller than the opening defined by interior surface 30, so that end portion 84 can freely move in and out of passageway 12 due to relative axial shifting of conductors 10 and 74, while surface 30 properly directs the shifting movement of end portion 84 and conductor 74.

Support element 16 has an arm 34 which extends outward past end 14 of tube 11. The interior surface 30 of support element 16 extends along arm 34, so that surface 30 is continuous. The exterior surface 36 of arm 34 is tapered inward toward the central axis of conductor 10. This tapered shape provides a normal inward tilt for the individual spring biased contact elements 46, to be described further below, whereby the second contacting surfaces 66 of contact elements 46 will securely engage conductor end portion 84.

Arm 34 has a protrusion 38 near its end which extends outward with respect to the central axis of conductor 10. This protrusion serves as a guide for movement of the contact means 44, as will be described below.

An electrically conductive contact means 44 is held on conductor 10 and is provided for securing the first and contact means 44 is copper, which has a higher conductivity and is less subject to wear than the aluminum of conductors 10 and 74 and of support element 16. Contact means 44 actually comprises a number of individual, spaced apart spring biased contact elements 46, each of which is identical. Together the contact elements form a tulip type of connector. The contact elements may be shifted outward or inward with respect to the central axis of conductor 10. There is sufficient distance between the elements that they may be moved inward with respect to the axis of conductor 10 as far as wall 52 of notch 48 allows, as considered below.

Referring to FIGS. 1 and 2, only one of the contact elements 46 will be considered, it being understood that all of these elements are identical. Element 46 includes a receiving means 48, shown as a notch, for receiving protrusion 38. The walls 50 of the notch are so inclined that no matter how element 46 is pivoted around its contact surface 58, described below, protrusion 38 will be able to be properly moved into notch 48. Notch 48 has an inner wall 52 against which the protrusion 38 is biased, by biasing means 68, to be described, pressing on element 46.

Contact element 46 has an arm 54 extending toward end 14 of tube 11 and away from notch 48. Arm 54 has a first contact surface 58 which contacts the surface 36 of arm 34 of support element 16. Element 16, as has been noted above, is effectively part of conductor 10.

First garter springs 60 surround all of contact elements 46, as can be seen in FIG. 3, and apply a biasing force which holds the first contact surfaces 58 of elements 46 always in secure mechanical and electrical engagement with support element surface 36. Garter springs 60 also bias all elements so that protrusion 38 is biased into engagement with walls 52 of notches into engagement with walls 52 of notches 48. Lobes 62 and 64 on arm 54 prevent garter springs 60 from slipping off the elements 46 as the elements pivot, in the manner to be described.

Contact element 46 has a contact arm 64 with a curved contact surface 66 for mechanically and electrically securely engaging end portion 84 of conductor 74. Garter springs 68, as can be seen in FIGS. 1 and 3, encircle all of the arms 64 of the contact elements 46 and normally bias the contact surfaces 66 inward with respect to the central axis of the conductors. This securely holds contact surfaces 66 in engagement with the aforementioned end portion 84. While garter springs 68 bias elements 46 inward, these elements cannot pivot inward further than the position where the contact surfaces 58 are in engagement with support element surface 36 and protrusion 38 is in engagement with notch walls 52.

When end portion 84 of second conductor 74 passes into the passageway entrance 70 defined by the contact surface 66 of all the contact elements 46, surfaces 66 are forced outward, against the biasing force of springs 68, and elements 46 are pivoted outward around their respective contact surfaces 58. Surfaces 58 roll over support element surface 36. As elements 46 pivot, the cooperation between protrusion 38 and each notch 48 provides a guide for the pivoting of elements 46 so that elements 46 do not shift axially with respect to the conductor 10 as they pivot.

Referring to FIG. 2, conductor 74 is provided, which is to be electrically and mechanically joined with conductor 10. Conductor 74 is essentially identical in structure to conductor 10, being comprised of a hollow, rectangular cross-section, tube 76 of electrically conductive aluminum, which tube is sufficiently thick to conduct the high electric currents generated in the generating installation. The cross-sectional dimensions of shell 76 are substantially identical to those of conductor 10.

To permit the two conductors to be joined, a connector section 80 is secured to the end of tube 76 that faces toward conductor 10. Connector section 80 includes a mounting plate 82 which is secured, by a weld, to the end 83 of tube 76. Plate 82 is so shaped that it is joined completely around the end 83 of tube 76. Secured to plate 82 is an elongated end portion 84 having smaller cross-sectional dimensions than tube 76. End portion 84 also has the form of a hollow, electrically conductive tube. The cross-sectional dimensions of end portion 84 substantially correspond to the cross-sectional dimensions of the opening through support element 16 which is defined by surface 30. In this manner end portion 84 may axially slide in and out of passageway 12 while being maintained in the proper axial orientation through the orientation of surface 30. Since conductor end portion 84 often rubbingly engages surface 30 of support element 16 and always rubbingly engages the contact surfaces 66 of contact elements 46, portion 84 is comprised of an electrically conductive material which wears well, like copper.

As can be seen in FIG. 1, contact surface 66 of contact element 46 is normally biased inward, with respect to conductor 10, further than surface 30 of support element 16. Therefore, when conductor end portion 84 passes contact surfaces 66, all of the contact surfaces 66 of the elements 46 are forced to pivot outward, around their respective contact surfaces 58 against the bias of garter springs 68, as described above.

With the structure disclosed above, when relative axial shifting of conductors 10 and 74 occurs, it is readily absorbed by the elongated end portion 84 shifting in or out of passageway 12, past contact surfaces 66 and support element surface 30. The rubbing engagement between contact surfaces 66 and end portion 84 remains secure as the conductors shift. End portion 84 is long enough to absorb the expected axial shifting of the conductors with respect to each other, while maintaining secure electrical and mechanical engagement between them. For instance, with a 400-foot to 600-foot run for the isolated phase bus bar comprised of conductors 10 and 74, the expected axial shifting of conductors 10 and 74 with respect to each other is from 6 to 8 inches. To absorb such axial shifting, and allow for a margin of safety, end portion 84 might have a length of 18 inches.

Although the invention has been described above with respect to its preferred embodiments, it will be understood that many variations and modifications will be obvious to those skilled in the art. It is preferred, therefore, that the scope of the invention be limited not by the specific disclosure herein but only by the appended claims.

The embodiments of the invention in which an inclusive privilege or property is claimed are defined as follows:

1. An expansion joint for electrically and mechanically joining first and second conductors of an isolated phase bus bar in axially slidable relationship,
   said bus bar comprising first and second conductors;
   said first and second conductors being mounted stationary with respect to each other;
   said joint comprising,
   said first conductor having a first end and having an end portion next to said first end;
   said second conductor also having a first end and having a central passageway extending inward from its said first end for receiving said end portion of said first conductor;
   said second conductor having a central axis and having a protrusion, in the vicinity of said first end of said second conductor, extending outward from said central axis thereof;
   contact means for mechanically and electrically joining said first and said second conductors; said contact means including a first contact surface means for mechanically and electrically engaging said second conductor at a location removed from said protrusion, a second contact surface means for mechanically and electrically engaging said first conductor when it extends into said passageway of said second conductor, and receiving means for receiving said protrusion on said second conductor;
   biasing means for normally biasing said second contact surface means toward said first conductor, whereby said second contact surface means securely engages said first conductor to hold said first conductor in proper position as it shifts axially with respect to said second conductor;
   said contact means having pivotable mounting means connecting it with said second conductor so that said second contact surface means can be pivoted outward to enable said first conductor to pass said second contact surface means and to extend into said passageway, and so that said second contact surface means will be biased inward securely against said first conductor as said first conductor axially shifts;
   said protrusion extending outward sufficiently so that said receiving means will continue to receive said protrusion as said contact means pivot, whereby said contact means is guided in its movement by the cooperation between said protrusion and said receiving means, so that said contact means is prevented from shifting axially with respect to said second conductor when said first and said second conductors axially shift with respect to each other.

2. The expansion joint of claim 1, wherein said first contact surface means is located further from said first end of said second conductor than said protrusion is located;
   said first contact surface means cooperates with said second conductor to form the pivot for said contact means.

3. The expansion joint of claim 1, wherein said contact means is a rigid element.

4. The expansion joint of claim 1, wherein said second contact surface means continuously engages said first conductor by frictional engagement.

5. The expansion joint of claim 4, wherein said contact means is held in engagement with said first conductor by means of a biasing means.

6. The expansion joint of claim 5, wherein said first contact surface means is located further from said first end of said second conductor than said protrusion is located;
   said first contact surface means cooperates with said second conductor to form the pivot for said contact means.

7. The expansion joint of claim 6, wherein said contact means is a rigid element.

8. The expansion joint of claim 1, wherein said second conductor includes a support element, directly secured to said second conductor; said support element including said protrusion; said support element having an interior surface which defines the entrance into said passageway in said second conductor;
   said first conductor end portion being shaped to substantially conform to the shape of said entrance of said support element, whereby said support element defines the orientations and shifting directions of both said end portion and said second conductor;
   said second contact surface means being normally biased inward toward said central axis of said first conductor so far that its normal position is further inward toward said central axis of said second conductor than is said interior surface of said support element, whereby said second contact surface means can be securely mechanically and electrically in engagement with said end portion of said first conductor, thereby creating a secure mechanical and electrical connection between said first and said second conductors.

9. The expansion joint of claim 8, wherein said first contact surface means is located further from said first end of said second conductor than said protrusion is located;
   said first contact surface means cooperates with said second conductor to form the pivot for said contact means;
   said contact means is a rigid element;

said second contact surface continuously engages said first conductor by frictional engagement.

10. The expansion joint of claim 9, wherein said contact means is held in engagement with said first conductor by means of a biasing means.

11. The expansion joint of claim 10, wherein said contact means is comprised of a number of individually biased contact elements, each of which is provided with a first and second contact surface, which surfaces cooperate, respectively, to form said first and said second contact surface means.

References Cited

UNITED STATES PATENTS

| 2,229,006 | 1/1941 | Rudd | 200—48 |
| 3,009,043 | 11/1961 | Goodwin et al. | 339—64 X |

RICHARD E. MOORE, Primary Examiner

U.S. Cl. X.R.

174—99